United States Patent
Fechtel et al.

(10) Patent No.: US 7,817,731 B2
(45) Date of Patent: Oct. 19, 2010

(54) AMPLITUDE COMPRESSION OF SIGNALS IN A MULTICARRIER SYSTEM

(75) Inventors: Stefan Fechtel, München (DE); Andreas Menkhoff, Oberhaching (DE)

(73) Assignee: Infineon Technologies AG, Neubiberg (DE)

( * ) Notice: Subject to any disclaimer, the term of this patent is extended or adjusted under 35 U.S.C. 154(b) by 1141 days.

(21) Appl. No.: 10/945,655

(22) Filed: Sep. 21, 2004

(65) Prior Publication Data

US 2005/0063481 A1 Mar. 24, 2005

Related U.S. Application Data

(60) Provisional application No. 60/504,847, filed on Sep. 22, 2003.

(51) Int. Cl.
*H04K 1/10* (2006.01)

(52) U.S. Cl. ............... 375/260; 375/267; 375/268; 375/296; 375/300

(58) Field of Classification Search ............ 375/260, 375/267, 268, 261, 316, 322, 355, 219, 349, 375/347
See application file for complete search history.

(56) References Cited

U.S. PATENT DOCUMENTS

| | | | | |
|---|---|---|---|---|
| 5,239,378 A * | 8/1993 | Tsuji et al. | | 348/625 |
| 5,815,507 A * | 9/1998 | Vinggaard et al. | | 714/704 |
| 6,456,654 B1 * | 9/2002 | Ginesi et al. | | 375/229 |
| 6,711,123 B1 * | 3/2004 | Taira | | 370/208 |
| 6,850,051 B2 * | 2/2005 | Roberts et al. | | 324/76.54 |
| 7,076,168 B1 * | 7/2006 | Shattil | | 398/76 |
| 7,095,814 B2 * | 8/2006 | Kyeong et al. | | 375/347 |
| 7,099,678 B2 * | 8/2006 | Vaidyanathan | | 455/500 |
| 7,151,948 B2 * | 12/2006 | Ishii et al. | | 455/522 |
| 7,327,793 B2 * | 2/2008 | Jin | | 375/260 |
| 7,340,004 B2 * | 3/2008 | Vuopala et al. | | 375/295 |
| 2001/0017943 A1 * | 8/2001 | Otsuka | | 382/262 |
| 2002/0054621 A1 * | 5/2002 | Kyeong et al. | | 375/147 |
| 2002/0181549 A1 * | 12/2002 | Linnartz et al. | | 375/142 |
| 2003/0016855 A1 * | 1/2003 | Shinbata | | 382/132 |

FOREIGN PATENT DOCUMENTS

| | | |
|---|---|---|
| DE | 198 57 821 A1 | 6/2000 |
| EP | 0 788 265 A2 | 1/1997 |
| WO | WO91/17606 | 11/1991 |

* cited by examiner

*Primary Examiner*—Shuwang Liu
*Assistant Examiner*—Dhaval Patel
(74) *Attorney, Agent, or Firm*—Dicke, Billig & Czaja, PLLC

(57) ABSTRACT

The channel estimates for the subcarriers are used to determine the signal strength distribution in the form of a cumulative histogram. The latter is used to determine, as a signal strength threshold value E, that maximum signal strength whose magnitude is less than or equal to the signal strengths of a predetermined number L of subcarriers which are to be limited, i.e. saturated, in the signal processing path. The signal strength threshold value E and a constant K are used to form a multiplication factor M with which the data signals are weighted or by which the data signals are multiplied, the L subcarriers being limited to a fixed value after multiplication.

18 Claims, 1 Drawing Sheet

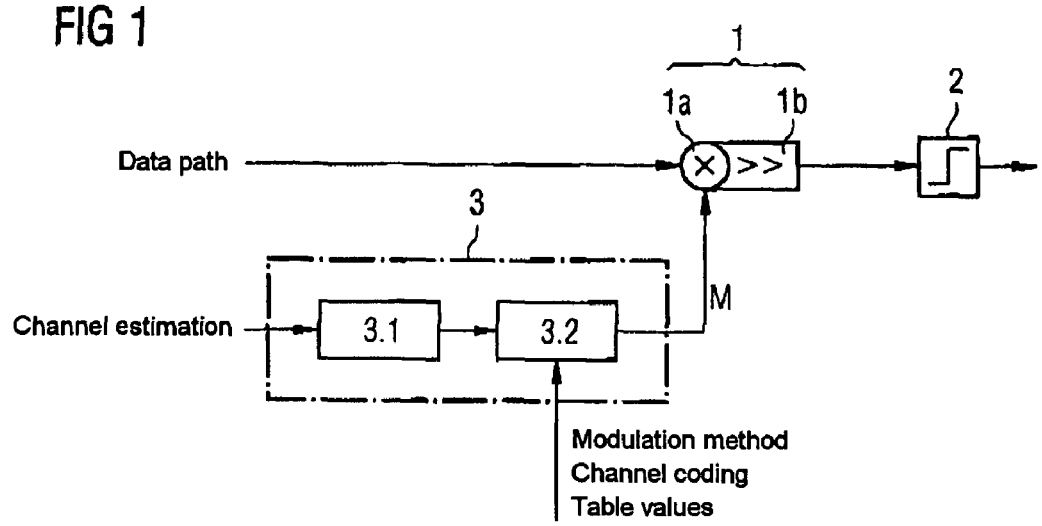
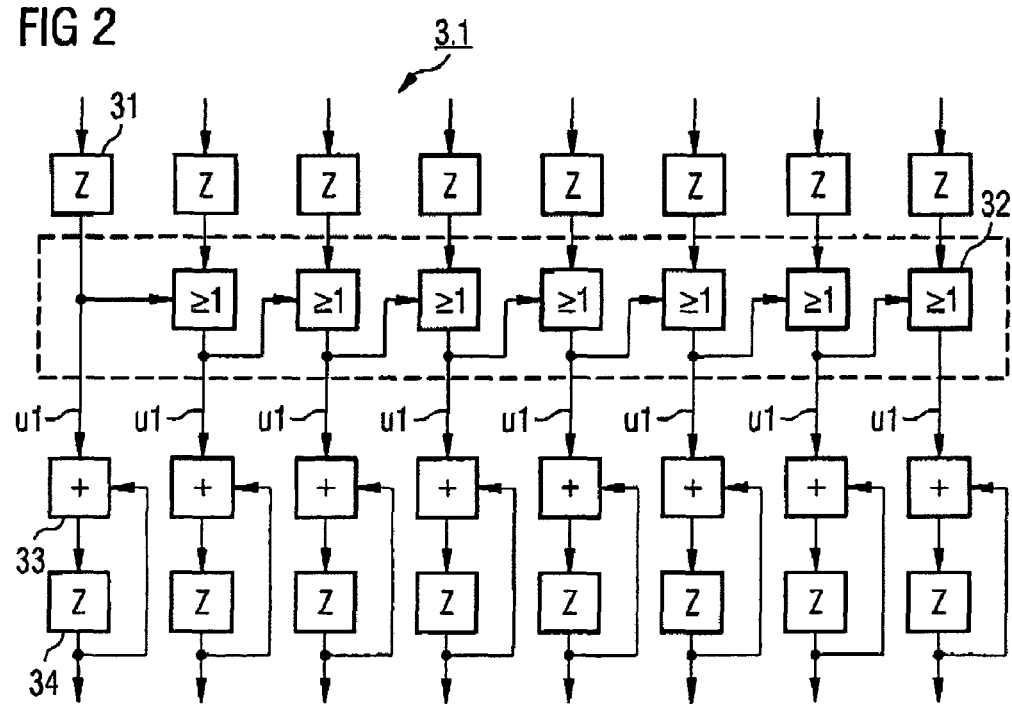

AMPLITUDE COMPRESSION OF SIGNALS IN A MULTICARRIER SYSTEM

PRIORITY

This application is a conversion of and claims priority to Provisional Application 60/504,847 filed Sep. 22, 2003.

TECHNICAL FIELD OF THE INVENTION

The invention relates to multicarrier radio transmission systems and relates to a method for matching the signal amplitudes of a received signal's subcarriers at the receiver end and to an apparatus for carrying out the method.

DESCRIPTION OF THE RELATED ART

In multicarrier systems, the entire transmission band is divided up into a large number of (sometimes more than 1000) subbands. In this case, one subband may be at an attenuation maximum, whereas another subband may be at an attenuation minimum. The amplitude range of the individual subbands is therefore very different: the amplitude range is very small close to the attenuation maxima, but is comparatively large in between the latter. In addition, the transmission level itself may be very different: if the transmitter is nearby, the average signal level is high. If the transmitter is far away, the average signal level may be so low that, despite maximum gain in the signal path, it still has a small amplitude.

In the prior art, received signals are represented, implemented and processed in a fixed data format throughout the entire signal processing chain. If need be, the word lengths are reduced in such a manner that the amplitude of the digitized signal waveforms is not limited, that is to say no saturation effects therefore occur. It is only at the end of the signal processing chain that the decoder effects reduction to binary format, as intended. The amplitude range is thus fixed at a constant value along the signal processing chain. If an analogue signal is processed on the basis of discrete amplitudes in this case, the quantization levels are statically fixed and are used to process the signal further. During this fixing, it is necessary to find a compromise between the signal processing accuracy, on the one hand, and the complexity of the circuits, on the other hand. A large amplitude range and a large number of quantization levels increase the signal processing accuracy but a small amplitude range and a small number of quantization levels reduce the complexity of all further signal processing stages and therefore also the circuit's chip area and production costs.

SUMMARY OF THE INVENTION

Therefore, it is an object of the present invention to specify a method for matching the signal amplitudes of a received signal's subcarriers in a multicarrier transmission system, which method can be used to reduce the circuit's complexity without any significant loss of processing quality.

This object can be achieved by a method for matching the signal amplitudes of a received signal's N subcarriers in multicarrier radio transmission, comprising the steps of:

multiplying or weighting the subcarrier data signals by/with a multiplication factor M, and setting the data signal values whose signal strength is above a particular signal strength threshold value E to a fixed value.

Channel estimation can be carried out for each subcarrier and based on the signal strength distribution of the channel estimates for the subcarriers that maximum signal strength, whose magnitude is less than or equal to the signal strengths of a predetermined number L of subcarriers which are to be saturated, can be determined as a signal strength threshold value E. The multiplication factor M can be formed from the signal strength threshold value E and a constant K, and the L subcarriers can be limited to a fixed value after multiplication. The signal strength distribution can be determined as a cumulative histogram by processing digital channel estimates for the subcarriers bit-by-bit in parallel, with each bit processing path containing a first delay element, each bit processing path, apart from the most significant bit processing path, containing an OR gate whose first input is connected to the output of the respective first delay element and whose second input is connected to the output of the respective OR gate with the next highest significance, the output of the delay element in the most significant bit processing path being connected to the second input of the OR gate with the next lowest significance, each bit processing path containing an arithmetic adder element whose first input is connected to the output of the OR gate or, in the most significant bit processing path, to the output of the delay element, and each bit processing path containing a second delay element whose input is connected to the output of the arithmetic adder element and whose output is connected to the second input of the arithmetic adder element, and a signal strength distribution vector or histogram vector being output at the output of the second delay element. The weighting operation can be a multiplication operation and the multiplication factor M can be formed by means of $M=K \times E$ (K constant) and the subcarrier signals can be multiplied by the multiplication factor M, or the weighting operation can be a bit shift operation and the multiplication factor M may become a shift factor M and can be formed by means of $M=K+E$. The values for K and L can be determined on the basis of the modulation method, the channel coding method and, in the case of convolutional coding, the puncturing method, and the values which are dependent in this manner are possibly stored in a look-up table. Saturation can be effected by reducing the word length in the signal processing path. The word length can be reduced after weighting.

The object can also be achieved by an apparatus for carrying out a method for matching the signal amplitudes of a received signal's N subcarriers in multicarrier radio transmission, comprising means for multiplying the subcarrier data signals by, or weighting the subcarrier data signals with, a multiplication factor M, and means for limiting the signal value of the subcarrier data signals.

The apparatus may further comprise a multiplication factor determination circuit comprising a signal strength distribution determination circuit and an evaluation circuit for determining a signal strength threshold value E, wherein the multiplication factor M is formed from the signal strength threshold value E and a constant K and the evaluation circuit comprises a look-up table which stores the values for K and L on the basis of modulation method, channel coding method and, in the case of convolutional coding, puncturing method, the evaluation circuit being designed to determine the signal strength threshold value E from the signal strength distribution vector or histogram vector supplied by the signal strength distribution determination circuit and to form the multiplication factor M by means of $M=K \times E$ or $M=K+E$. The signal strength distribution determination circuit may have a number of parallel bit processing paths, with each bit processing path containing a first delay element, each bit processing path, apart from the most significant bit processing path, containing an OR gate whose first input is connected to the output of the respective first delay element and whose second input is connected to the output of the respective OR gate with the next highest significance, the output of the first delay element in the most significant bit processing path being connected to the second input of the OR gate with the next lowest significance, each bit processing path containing an arithmetic adder element whose first input is connected to the output of the OR gate or, in the most significant bit processing path, to the output of the delay element, and each bit processing path containing a second delay element whose input is connected to the output of the arithmetic adder element and whose output is connected to the second input of the arithmetic adder element. The means for multiplication or weighting can be formed by a multiplier. The means for limiting the signal value can be implemented by reducing the signal processing word length.

In the inventive method, the subcarrier data signals are multiplied by, or weighted with, a multiplication factor, and data signal values whose signal strength is above a particular signal strength threshold value E are then set (saturated) to a fixed value.

This makes it possible to dynamically compress the amplitude range of an input signal on the basis of its signal strength in such a manner that the amplitude range of the output signal and thus of the subsequent signal processing is reduced to the lowest possible value without this entailing any significant loss of accuracy. The amplitude range and the quantization levels are thus considerably much better matched to the signal, with the result that, with a smaller amplitude range and fewer quantization levels and thus lower production costs, it is possible to achieve virtually the same processing quality as before.

In a multicarrier transmission system, channel estimation is usually carried out for each subcarrier in the receiver in order to equalize the input data on the basis of the channel estimates. The inventive method is preferably carried out in such a manner that a signal strength distribution for the channel estimates for the subcarriers is first of all determined. The signal strength distribution is taken as a basis for determining, as a signal strength threshold value E, a maximum value for the signal strength whose magnitude is less than or equal to the signal strengths of a predetermined number L of subcarriers which are to be saturated in the signal processing path. The signal strength distribution is thus used to determine the signal strength threshold value E at which a maximum fixed number L<N of a total of N subcarriers are saturated. The multiplication factor M is formed from the signal strength threshold value E and a constant K, and the L subcarriers are limited to a fixed value after multiplication.

The operation of weighting the subcarrier data signals may be a pure multiplication operation and the multiplication factor M may be formed by means of $M=K \times E$ and the subcarrier data signals may be multiplied by the multiplication factor M. Alternatively, the weighting operation may also be implemented in the form of a barrel shifter, with the result that M mutates to form a shift factor, where $M=K+E$.

The values for K and L may depend on the modulation method (for example BPSK, QPSK, 8PSK, 16QAM, ...) and on the channel coding—and also, in the case of a convolutional code, on the puncturing of the latter. In this case, provision may be made for this dependence to be taken into account by a look-up table, that is to say for the values for K and L to be stored in the look-up table on the basis of the modulation method or channel coding method.

The signal values can be limited or saturated after weighting by reducing the word length.

The signal strength distribution of the channel estimates for the subcarriers may advantageously be determined as a cumulative histogram. In this case, the digital channel estimates for the subcarriers are processed bit-by-bit in parallel using the following circuit design: each bit processing path contains a first delay element to which the respective bit in the channel estimate is supplied. Each bit processing path, apart from the most significant bit processing path, also contains an OR gate whose first input is connected to the output of the respective first delay element and whose second input is connected to the output of the respective OR gate with the next highest significance, the output of the delay element in the most significant bit processing path being connected to the second input of the OR gate with the next lowest significance. Each bit processing path also contains an arithmetic adder element whose first input is connected to the output of the OR gate or, in the most significant bit processing path, to the output of the delay element. Each bit processing path also contains a second delay element whose input is connected to the output of the arithmetic adder element and whose output is connected to the second input of the arithmetic adder element. The signal strength distribution vector or histogram vector is then output at the output of the second delay element.

The signal strength threshold value E can be determined in a simple manner from the histogram vector and the prescribed number L of subcarriers which are to be saturated.

An apparatus for carrying out the inventive method contains means for multiplying the subcarrier data signals by, or weighting the subcarrier data signals with, the multiplication factor M, and means for limiting the signal value of the subcarrier data signals.

The apparatus preferably also has a multiplication factor determination circuit comprising a signal strength distribution determination circuit and an evaluation circuit. The evaluation circuit may in this case have a look-up table which stores the values for K and L on the basis of the modulation method, the channel coding method and, in the case of a convolutional code, the puncturing method. The evaluation circuit may be designed to determine the signal strength threshold value E from the signal strength distribution vector or histogram vector supplied by the signal strength distribution determination circuit and to form the multiplication factor M by means of $M=K \times E$ or $M=K+E$.

The means for multiplying or weighting the subcarrier data signals may be formed by a multiplier or a barrel shifter.

The means for limiting the signal value may be implemented by reducing the signal processing word length to a word length whose maximum value corresponds to the desired limit value.

BRIEF DESCRIPTION OF THE DRAWINGS

An exemplary embodiment is explained in more detail below with reference to the figures of the drawing, in which:

FIG. 1 shows a basic block diagram of an exemplary circuit for carrying out the inventive method; and FIG. 2 shows an exemplary circuit for forming the cumulative histogram.

DETAILED DESCRIPTION OF THE REFEREED EMBODIMENTS

FIG. 1 shows how the data in a received signal are supplied to a combined multiplier/limiter 1. In the multiplier 1a, the subcarrier data signals are multiplied by the multiplication factor M which is supplied to the multiplier 1a. The signal processing word length is reduced in the adjoining limiter 1b. Reduction to a word length of 10 bits (with an arithmetic sign) may be effected, for example, with the result that all values greater than 511 (or less than −512) are cut to 511 (−512), that is to say are "saturated". The signals are then supplied to the decoder 2.

The multiplication factor M is determined in a multiplication factor determination circuit 3 and is supplied to the multiplier 1a in order to carry out arithmetic multiplication. A channel estimator supplies the channel estimates to the multiplication factor determination circuit 3. The multiplication factor determination circuit 3 has a signal strength distribution determination circuit 3.1 and an evaluation circuit 3.2. The channel estimates are first of all supplied to the signal strength distribution determination circuit 3.1.

FIG. 2 shows the signal strength distribution determination circuit 3.1 in greater detail. This circuit generates, in response to the sequentially arriving channel estimates for the subcarriers, a cumulative histogram in the form of a histogram vector which can then be used to determine the signal strength threshold value E (with a prescribed L).

In this illustration, the channel estimates are supplied to the signal strength distribution determination circuit 3.1 with a word length of 8 bits, that is to say corresponding to a numerical range of 0 . . . 255 (without an arithmetic sign). After a number of N channel estimates—corresponding to the number N of subcarriers—have been supplied to the circuit 3.1, the latter outputs, at the bottom, the desired histogram vector with the same word length of 8 bits.

The channel estimate bits which are supplied to the circuit 3.1 are processed in bit processing paths, with the most significant bit being processed in the bit processing path depicted at the left-hand edge and the least significant bit being processed in the bit processing path depicted at the right-hand edge. In each bit processing path, the bits are first of all supplied to a first delay element 31, which is labelled "Z". Each bit processing path, apart from the most significant bit processing path, furthermore contains an OR gate 32, which is labelled "≧1". The first input of the OR gate 32 is connected to the output of the respective first delay element 31 and the second input of the OR gate 32 is connected to the output of the respective OR gate 32 with the next highest significance. The output of the delay element 31 in the most significant bit processing path is connected to the second input of the OR gate 32 with the next lowest.

The area depicted by dashed lines in FIG. 2 is referred to as a ripple path. Two input bits are combined with one another in the OR gates 32 in such a manner that the output is 1 when at least one input is also 1. The circuit causes all bits to the right of the first 1 in a supplied channel estimate to likewise be 1. The output word which is output on the lines labelled u1 thus has the format [0 . . . 01 . . . 1], with the words [0 . . . 0] and [1 . . . 1] likewise being possible.

Each bit processing path furthermore contains an arithmetic adder element 33, which is labelled "+". The first input of the adder element 33 is connected to the output of the OR gate 32 or, in the most significant bit processing path, to the output of the delay element 31.

Each bit processing path furthermore contains a second delay element 34 whose input is connected to the output of the arithmetic adder element 33 and whose output is connected to the second input of the arithmetic adder element 33. The second delay element 34 is also labelled "Z". The outputs of the second delay elements 34 are therefore fed back to an input of the arithmetic adder elements 33. This results in the number of respective bits which arrive from above being incremented by 1.

A signal strength distribution vector or histogram vector is output at the output of the second delay elements 34. Each component in the histogram vector indicates the number of subcarriers which "use" the respective bit place.

By way of example, the number N of channel estimates shall be N=4 with channel estimates having a word length of 8. This then results, for example, in the following table for the arriving channel estimates and their magnitudes and the output signal values from the circuit depicted by dashed lines.

| arriving channel estimates (magnitudes) | output from the circuit depicted by dashed lines |
|---|---|
| [00010101] | [00011111] |
| [00000110] | [00000111] |
| [00011001] | [00011111] |
| [00001110] | [00001111] |

The histogram vector [00023444] is output at the output, that is to say four subcarriers use bit places 1, 2 and 3, three subcarriers use bit place 4, two subcarriers use bit place 5 and no subcarrier uses bit places 6, 7 and 8.

The histogram vector which has been determined in this manner is thus output with a word length of 8 and is input into the evaluation circuit 3.2. The histogram vector is first of all used in the evaluation circuit 3.2 to determine the signal strength threshold value E. The number L (which is currently to be used) of subcarriers which are to be saturated in the circuit must be determined beforehand. To this end, information relating to the modulation method used and the channel coding method used and, in the case of convolutional coding, the puncturing method used is supplied to the evaluation circuit 3.2. The evaluation circuit 3.2 may use this information to retrieve the values of L and the constant K from a look-up table in which these values had previously been stored. After the signal strength threshold value E has been determined on the basis of the number L and the histogram vector, it can be used to determine the multiplication factor M by means of M=E×K, said multiplication factor being output.

The multiplication factor M is supplied to the multiplier 1a and the multiplied signal is then transferred to the limiter 1b in which the previously fixed number of L subcarriers are saturated.

We claim:

1. A method for matching the signal amplitudes of a received signal's N subcarriers in a multicarrier radio transmission system, the method comprising:
   determining, with the multicarrier radio transmission system, channel estimates for each one of the N subcarriers,
   determining, with the multicarrier radio transmission system, from the N subcarrier's channel estimates, a signal strength distribution as a cumulative histogram,
   determining, based on the signal strength distribution of the channel estimates, a signal strength threshold value E as a maximum signal strength, whose magnitude is less than or equal to the signal strength of a predetermined number L of subcarriers,
   multiplying or weighting, with the multicarrier radio transmission system, subcarrier data signals by/with a multiplication factor M, and
   setting, with the multicarrier radio transmission system, data signal values whose signal strength is above the signal strength threshold value E to a fixed value.

2. The method according to claim 1, wherein
   the signal strength distribution is determined as a cumulative histogram by processing digital channel estimates for the subcarriers bit-by-bit in parallel, with
   each bit processing path containing a first delay element, each bit processing path, apart from a most significant bit processing path, containing an OR gate whose first input is connected to an output of the respective first delay element and whose second input is connected to an output of the respective OR gate with a next highest significance, an output of the delay element in the most significant bit processing path being connected to the second input of the OR gate with a next lowest significance, each bit processing path containing an arithmetic adder element whose first input is connected to the output of the OR gate or, in the most significant bit processing path, to the output of the delay element, and each bit processing containing a second delay element whose input is connected to the output of the arithmetic adder element and whose output is connected to the second input of the arithmetic adder element, and a signal strength distribution vector or histogram vector being output at the output of the second delay element.

3. The method according to claim 1, wherein the weighting operation is a multiplication operation and the multiplication factor M is formed by means of M=K×E (K constant) and the subcarrier signals are multiplied by the multiplication factor M, or the weighting operation is a bit shift operation and the multiplication factor M becomes a shift factor M and is formed by means of M=K+E.

4. The method according to claim 1, wherein saturation is effected by reducing a word length in a signal processing path.

5. The method according to claim 4, wherein the word length is reduced after weighting.

6. The method of claim 1, wherein the signal strength threshold value E is determined from the signal strength distribution.

7. A method for matching the signal amplitudes of a received signal's N subcarriers in a multicarrier radio transmission system, the method comprising:

multiplying or weighting, with the multicarrier radio transmission system, subcarrier data signals by/with a multiplication factor M, and setting, with the multicarrier radio transmission system, data signal values whose signal strength is above a particular signal strength threshold value E to a fixed value, wherein channel estimation is carried out for each subcarrier and wherein based on a signal strength distribution of the channel estimates for the subcarriers that maximum signal strength, whose magnitude is less than or equal to the signal strengths of a predetermined number L of subcarriers which are to be saturated, is determined as the signal strength threshold value E, the multiplication factor M is formed from the signal strength threshold value E and a constant K, and the L subcarriers are limited to a fixed value after multiplication.

8. The method according to claim 7, wherein the values for K and L are determined on the basis of a modulation method, a channel coding method and, in the case of convolutional coding, a puncturing method, and the values which are dependent in this manner are possibly stored in a look-up table.

9. An apparatus for carrying out a method for matching the signal amplitudes of a received signal's N subcarriers in multicarrier radio transmission, comprising:

means for multiplying subcarrier data signals by, or weighting the subcarrier data signals with, a multiplication factor M, means for limiting the signal value of the subcarrier data signals to a maximum value, and a multiplication factor determination circuit comprising a signal strength distribution determination circuit, which has a number of parallel bit processing paths, wherein each bit processing path contains a first delay element, each bit processing path, apart from a most significant bit processing path, containing an OR gate whose first input is connected to an output of the respective first delay element and whose second input is connected to an output of the respective OR gate with a next highest significance, an output of the delay element in the most significant bit processing path being connected to the second input of the OR gate with a next lowest significance, each bit processing path contains an arithmetic adder element whose first input is connected to the output of the OR gate or, in the most significant bit processing path, to the output of the delay element, and each bit processing path contains a second delay element whose input is connected to the output of the arithmetic adder element and whose output is connected to the second input of the arithmetic adder element.

10. The apparatus according to claim 9, wherein the means for multiplication or weighting are formed by a multiplier.

11. An apparatus for carrying out a method for matching the signal amplitudes of a received signal's N subcarriers in multicarrier radio transmission, comprising:

means for multiplying subcarrier data signals by, or weighting the subcarrier data signals with, a multiplication factor M, means for limiting the signal value of the subcarrier data signals to a maximum value, and a multiplication factor determination circuit comprising a signal strength distribution determination circuit, which has a number of parallel bit processing paths and outputs a signal strength distribution vector or histogram vector, wherein the multiplication factor determination circuit further comprises an evaluation circuit for determining a signal strength threshold value E, wherein the evaluation circuit is designed to determine the signal strength threshold value E from the signal strength distribution vector or histogram vector supplied by the signal strength distribution determination circuit and a number L of subcarriers that are to be limited, and wherein the multiplication factor M is formed from the signal strength threshold value E and a constant K by means of M=K×E or M=K+E and the evaluation circuit comprises a look-up table which stores the values for the constant K and the number L of subcarriers that are to be limited on the basis of modulation method, channel coding method and, in the case of convolutional coding, puncturing method.

12. An apparatus for matching the signal amplitudes of a received signal's N subcarriers in multicarrier radio transmission, comprising:

means for carrying out a channel estimation for each subcarrier, means for multiplying or weighting subcarrier data signals by/with a multiplication factor M, means for setting data signal values whose signal strength is above a particular signal strength threshold value E to a fixed value, means for determining a signal strength distribution as a cumulative histogram, and means for determining as a signal strength threshold value E based on the signal strength distribution of the channel estimates for the subcarriers that maximum signal strength, whose magnitude is less than or equal to the signal strengths of a predetermined number L of subcarriers which are to be saturated, the multiplication factor M is formed from the signal strength threshold value E and a constant K, and means for limiting the L subcarriers to a fixed value after multiplication.

13. The apparatus according to claim 12, wherein the signal strength distribution is determined by processing digital channel estimates for the subcarriers bit-by-bit in parallel, wherein each bit processing path contains a first delay element, each bit processing path, apart from a most significant bit processing path, containing an OR gate whose first input is connected to an output of the respective first delay element and whose second input is connected to an output of the respective OR gate with a next highest significance, an output of the delay element in the most significant bit processing path being connected to the second input of the OR gate with a next lowest significance, each bit processing path containing an arithmetic adder element whose first input is connected to the output of the OR gate or, in the most significant bit processing path, to the output of the delay element, and each bit processing path containing a second delay element whose input is connected to the output of the arithmetic adder element and whose output is connected to the second input of the arithmetic adder element, and a signal strength distribution vector or histogram vector being output at the output of the second delay element.

14. The apparatus according to claim 12, further comprising means for performing a multiplication operation as the weighting operation wherein the multiplication factor M is formed by means of M=K×E (K constant) and the subcarrier signals are multiplied by the multiplication factor M.

15. The apparatus according to claim 12, further comprising means for performing a bit shift operation as the weighting operation wherein the multiplication factor M becomes a shift factor M and is formed by means of M=K+E.

16. The apparatus according to claim 12, further comprising means for determining the values for K and L on the basis of a modulation method, a channel coding method and, in the case of convolutional coding, a puncturing method, and means for storing the values which are dependent in this manner in a look-up table.

17. The apparatus according to claim 12, further comprising means for reducing a word length in a signal processing path to effect saturation.

18. The apparatus according to claim 12, further comprising means for reducing the word length after weighting.

* * * * *